United States Patent [19]

Fisk

[11] 3,995,374
[45] Dec. 7, 1976

[54] SMALL INTERNAL DIAMETER BORE GAUGE

[76] Inventor: James C. Fisk, G-3219 E. Bristol, Burton, Mich. 48529

[22] Filed: Aug. 26, 1975

[21] Appl. No.: 607,756

[52] U.S. Cl. .......................... 33/178 R; 33/147 F; 33/147 K; 33/162
[51] Int. Cl.² .......................................... G01C 5/12
[58] Field of Search ......... 33/143 R, 143 E, 147 E, 33/147 K, 162, 178 R, 178 F

[56] References Cited

UNITED STATES PATENTS

| 1,806,893 | 5/1931 | Cunningham | 33/178 R |
| 2,595,917 | 5/1952 | Bath et al. | 33/178 R |
| 2,674,046 | 4/1954 | Kaye | 33/147 K |

FOREIGN PATENTS OR APPLICATIONS

| 546,843 | 7/1942 | United Kingdom | 33/178 R |
| 682,790 | 11/1952 | United Kingdom | 33/178 R |
| 596,501 | 1/1948 | United Kingdom | 33/178 R |
| 1,224,154 | 3/1971 | United Kingdom | 33/162 |

Primary Examiner—Richard E. Aegerter
Assistant Examiner—Richard R. Stearns
Attorney, Agent, or Firm—Burton, Parker & Schramm

[57] ABSTRACT

A small diameter bore gauge or the like includes a probe having sensor means at one end and a plurality of longitudinally extending resiliently hinged fingers at the other end. A plunger extends along the probe and is connected to the sensor. Wedge cam means connected to the other end of the plunger has beveled planar surfaces cooperating with the fingers to swing them radially about their hinged connection with the probe into or out of contact with the bore wall to be gauged. Each finger has an outwardly facing work contacting surface and an inwardly facing narrow wedge cam contacting portion radially opposite the work contacting surface. A longitudinal groove divides either the wedge cam or the narrow wedge cam contacting surface to provide laterally spaced bearing areas.

7 Claims, 10 Drawing Figures

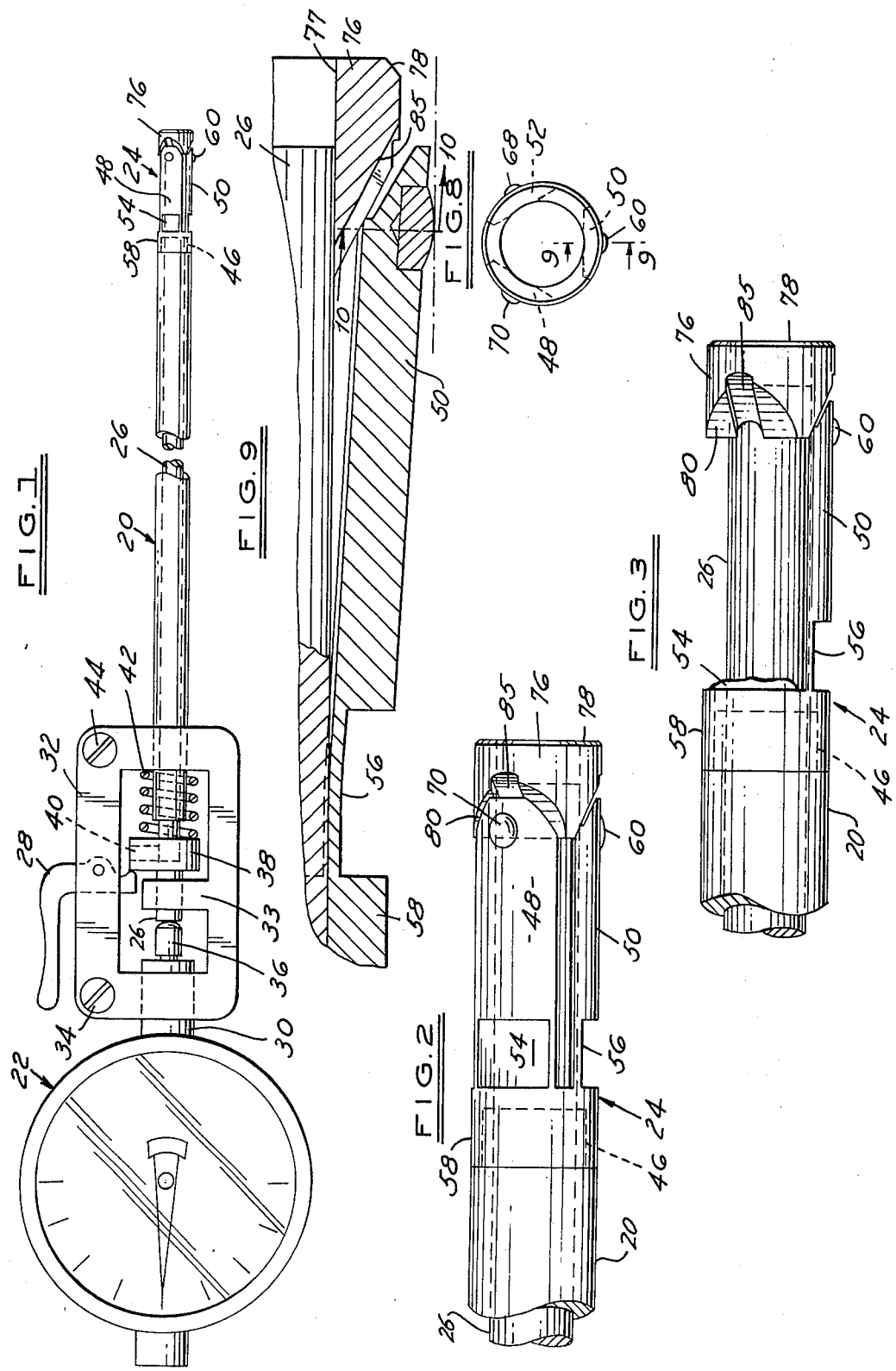

SMALL INTERNAL DIAMETER BORE GAUGE

FIELD OF INVENTION

This invention relates to gauges and more particularly to inside gauges of the kind useful in gauging small diameter bores, such as bores having a diameter on the order of 0.25 inches.

BACKGROUND OF THE INVENTION

In a gauge for measuring internal diameters of small bores, small gauging errors arising from the design or manufacture of the gauge itself become intolerably large, whereas in larger diameter bore gauges or other gauging functions the same errors would be inconsequential. For example, an error of 0.0005 inches in a small bore gauge having a range of 0.030 inches, while very small, is completely unacceptable, though possibly acceptable in gauges having a much wider range of movement.

In the design of bore gauges, it is known in the art to provide a gauge of essentially cylindric shape having a tubular work probe provided with a multiplicity of flexible fingers at the end of the probe which are radially displaced to engage the interior of the bore to perform the gauging function. The fingers are provided with conical or tapered surfaces on their distal inner edges with such surfaces of all the fingers being simultaneously engaged by the conical surface of a wedge cam on the end of a plunger running axially of the probe such that axial motion of the plunger causes radial expansion of the distal ends of the fingers until the fingers are restrained by the bore surface to be gauged. The axial movement between the plunger and the probe is measured by a dial indicator or other suitable sensing means to provide a comparative measure of the work diameter. Gauges of this type have inherent errors in their design and it is the primary object of the present disclosure to eliminate such design errors and provide a gauge of improved performance, quality, convenience and fabricational design.

SUMMARY OF THE INVENTION

I have discovered that in the prior art design, above described, the hinged connection of the proximal ends of the fingers to the probe together with the axial motion of the wedge cam presents a geometrical problem in that point of engagement between the fingers and the wedge cam shifts longitudinally as a result of the arcuate rather than rectilinear translational movement of the distal ends of the fingers. Because of this arcuate motion the ratio of relative movement of the wedge cam and fingers changes and is not linear, and thus disturbs the calibration accuracy of the gauge particularly where a long range of measurement ability is desired. I have overcome this inherent error in the design by relieving the surface of the finger which contacts the wedge cam so that it remains as a very narrow band or rib running transversely of the finger. To avoid any errors arising from the stresses of a couple action I have located this finger band or rib radially opposite or centrally of the work contact point of the finger.

Further, I have determined that planar beveled surfaces are superior to conical surfaces in accurcy of machining and fabrication. In addition, I provide a longitudinally extending relief or groove in either the beveled surface of the wedge cam or in the narrow rib or band of the finger whereby two laterally disposed bearing areas are provided to minimize transverse rocking of the fingers thereby producing errors.

Other advantages, objects and meritorious features will appear from the following description and drawings.

BRIEF DESCRIPTION OF THE DRAWINGS

FIG. 1 is a plan view of a small diameter bore gauge embodying my invention;

FIG. 2 is a fragmentary view of the wedge cam and finger assembly of the gauge showing the relationship of the parts;

FIG. 3 is a view similar to FIG. 2 but with one of the fingers broken away for clarity;

FIG. 8 is an end view of the probe;

FIG. 9 is a fragmentary cross-sectional view taken on line 9-9 of FIG. 8; and

BRIEF DESCRIPTION OF PREFERRED EMBODIMENT

Figure 5:
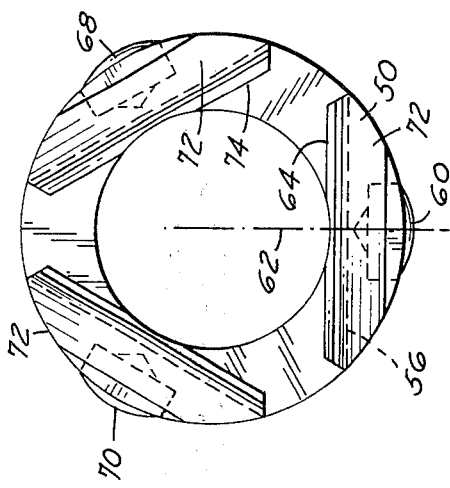
FIG. 5 is an end view of the finger assembly of FIG. 4 looking at the right-hand end thereof.

The small bore gauge herein disclosed is designed for use with bores having a diameter of about, for example, 0.250 inches. Gauges of the design herein disclosed may, of course, be used for measuring larger as well as smaller diameter bores. However, a gauge useful in measuring bores having diameter of approximately 0.250 inches is illustrated herein.

As best shown in FIG. 1 my improved gauge comprises a probe 20 on one end of which is measurement indicating means 22 and on the other end radially expansible and contractible work contacting assembly 24. Plunger means 26 extends coaxially through the probe 20 for connection at one end to the indicator 22 and at the opposite end cooperating with the work contacting assembly 24 as hereinafter described. The probe further includes trigger mechanism 28 which may be manually actuated by the operator to radially contract the work contact assembly 24 prior to insertion of the probe within the bore to be gauged, and following insertion release of the trigger causes expansion of the assembly into contact with the bore wall. Radial movement of the work contact assembly is transmitted through the plunger 26 to the indicator 22 where the diameter of the bore is referenced.

More particularly, the indicator 22 may comprise a standard dial indicator whose body portion includes a boss 30 clamped within a split frame 32; the frame being tightened on the boss 30 by the screw 34. The dial indicator includes a sensing plunger 36 the end of which abuts the probe plunger 26 as shown in FIG. 1. A stop 38 is mounted on plunger 26 and secured in place by a suitable set screw 40. Frame portion 33 will limit left-ward movement of the stop. A compression spring 42 bears at one end against the stop 38 and at the other end against the frame 32 urging the plunger 26 to the left in the direction of the dial indicator plunger 36. The frame 32 is clamped by the screw 44 on the probe 20.

The probe 20 comprises a hollow rigid tube having an outer diameter less than that of the bores to be gauged.

The probe 20 may be of any suitable length sufficient to reach the bottom of the bore to be measures. Its right-hand end has a reduced diameter portion 46 (See FIG. 2) onto which is press fitted the work contacting assembly 24. Such assembly comprises a plurality of longitudinally extending fingers, such as three, namely 48, 50 and 52 which are arranged to extend coaxially of the probe 20 and in effect form an extension thereof. The fingers are resiliently hinged to the probe at the hinge areas 54 and 56 and a corresponding hinged area, not shown, for the finger 52.

The hinge areas are formed by a transverse chordal relief which separates a cylindrical ring portion 58 of the finger assembly from each of the fingers. The fingers themselves are created by longitudinal chordal saw cuts in a cylindrical member parallel to the axis and normal to the radial axis of a work contacting surface 60 of the finger, such as the axis 62 shown in FIG. 5. The inside surface 64 of the finger 50 as shown in FIG. 5 and which results from the chordal saw cuts is parallel to the bottom wall of the chordal cuts 54 and 56 above mentioned.

Figure 10:
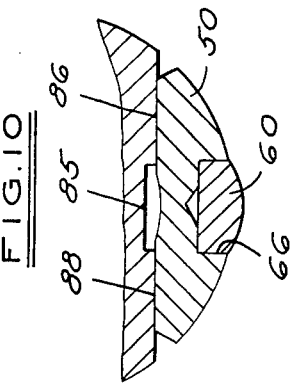
FIG. 10 is a cross-sectional view taken on the line 10—10 of FIG. 9.
Figure 4:
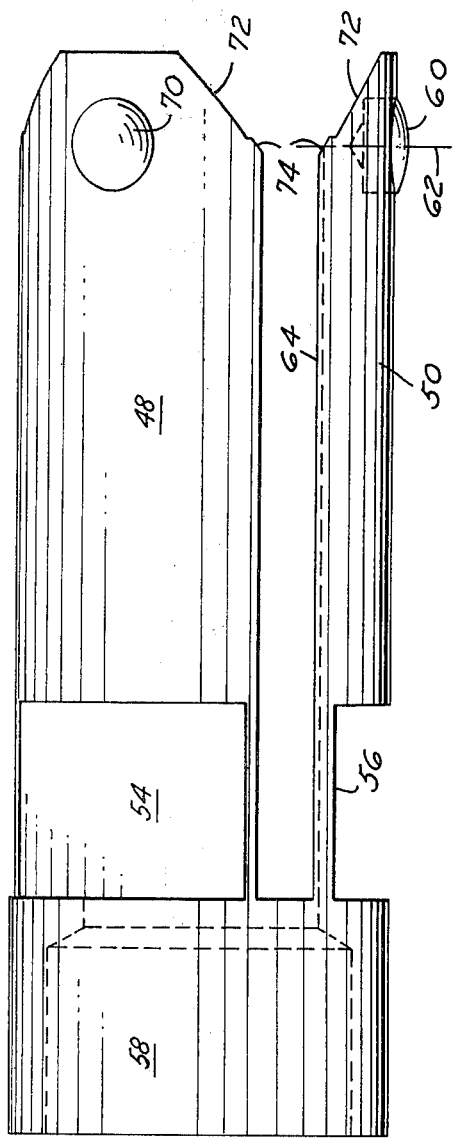
FIG. 4 is a side elevation of the finger assembly per se.
Figure 6:
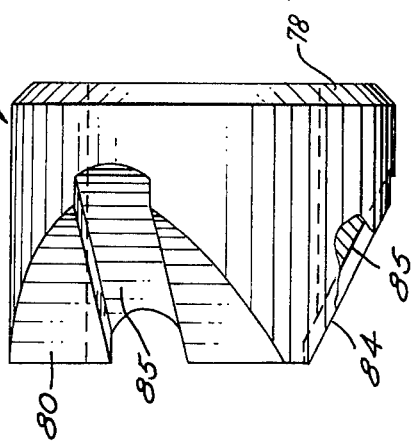
FIG. 6 is a side elevation of the wedge cam.
Figure 7:
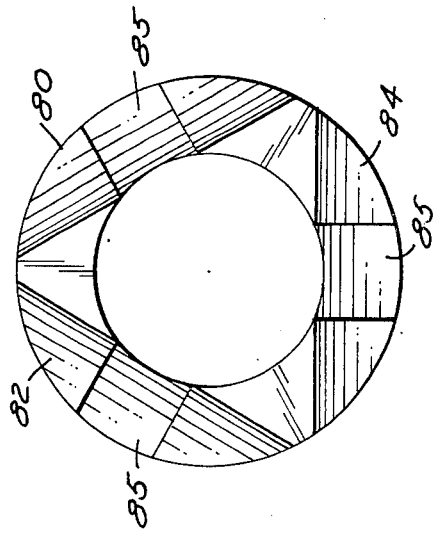
FIG. 7 is a view of the left-hand end of the wedge cam of FIG. 6.

The work contacting portion 60 of the finger 50 may comprise, as shown in FIGS. 4, 5 and 10, a spherical button-like protuberance formed of any suitably hard bearing material which is press fitted in a recess 66 in the finger such that the button faces radially outwardly. The exposed surface of the button may be of convex shape with the axis 62 extending through the apex of such convex shape and perpendicular to the surface 64. Similar buttons 68 and 70 are provided in each of the other two fingers. The respective axes of such buttons will intersect at the imaginary center of the finger assembly.

The distal ends of the fingers are internally beveled as at 72 (FIGS. 4 and 5). Such beveled surfaces are each provided with a narrow wedge cam contacting portion in the form of a transverse rib or band 74 which is disposed radially opposite the apex of the convex surface of each of the buttons 60, 68 and 70 for a purpose hereinafter described. As shown in FIGS. 4 and 5 with respect to button 60, the rib 74 is intersected by the axis 62. Such is true, as well, of the other buttons and ribs of the other fingers.

The internal diameter of the probe 20 is such that the plunger 26 has a smooth slip fit therein. The plunger 26 is provided at its distal end with wedge cam means 76 having a bore 77 press fitted or otherwise suitably secured to the end of the plunger 26 (FIG. 9). The wedge cam may be provided with an entering chamfer 78 to facilitate entering the gauge within the bore to be measured. The wedge cam is provided with a beveled planar caming for each of the fingers 48, 50 and 52 which beveled surface is disposed in opposition to the beveled surfaces 72 at the inner side at the distal ends of the fingers. Such beveled surfaces are shown at 80, 82 and 84. Such beveled surfaces are flat planes arranged equally circumferentially around the axis of the wedge cam as are the fingers 48, 50 and 52 arranged around the axis of the probe. The angle of the beveled surfaces 80, 82 and 84 relative to the axis of the wedge cam has a trigonometric tangent equal to 0.500, or in other words 26° 34 minutes thereby providing a 1.1 ratio between axial displacement of the plunger and radial motion of the fingers. The surface of the narrow band or rib 74 opposed to the bevels 80, 82 and 84 is machined as a planar surface having the same angle as that of the bevels. The outer diameter of the wedge cam 76 should be such so that it may be entered within the bore of the work piece to be measured.

Slight fabricational errors in the planes of the beveled surfaces 80, 82 and 84 and the narrow bands or ribs 74 can result in some transverse rocking of the fingers on the beveled surfaces producing errors. To overcome this it is desirable to relieve longitudinally either the beveled surfaces 80, 82 and 84 or the beveled surfaces 72 and 74 of the fingers to provide two distinct fairly widely spaced bearing areas 86 and 88 as shown in FIG. 10 between each finger and its corresponding opposed surface of the wedge cam. Each finger has sufficient torsional flexibility so that reasonable wedge cam thrusts will bring all cam surfaces properly together when the gauge contacts 60, 68 and 70 come against the wall of the bore being gauged. In the illustrated embodiment the wedge cam is relieved longitudinally as at 85 in each of its beveled surfaces 80, 82 and 84.

In the prior art small bore gauges errors in dial indicator readings seemed to increase with increasing range of measurement function. I traced this to an inherent design flaw which results from the fact that the motion of the distal ends or tips of the fingers is arcuate about their hinged connection to the probe, rather than simply perpendicular to the axis of the probe. As a result, and looking at the herein disclosed gauge, the plane of the bevels 72 tilt with respect to the beveled surfaces 80, 82 and 84 of the wedge cam as the plunger 26 and wedge cam 76 move longitudinally through the fingers to force the fingers outwardly or allow them to move inwardly. Consequently, in prior art gauges the point of engagement of the wedge cam and fingers would shift toward the distal end of the fingers as the plunger and wedge cam moved axially outwardly while the points of engagement would shift in the proximal direction as the plunger and wedge cam moved inwardly along the fingers. Because of this shift of the point of engagement of wedge cam and finger the ratio of relative motion of the wedge cam and finger changed thus disturbing calibration accuracy of the gauge particularly where a long range of measurement was desired. To put it another way, the relationship between axial motion of the wedge cam and radial motion of the fingers was not, in the prior art, a linear relationship over long ranges and introduced a gauge error.

I have discovered that this problem with the prior art gauges can be overcome by providing means at the point of engagement between the fingers and wedge cam which renders the ratio of movement a substantially linear function. Such means comprises the narrow band or transverse rib 74 on each finger which bears against only a small portion of the beveled surfaces 80, 82 and 84. As a result, while there is a small longitudinal shift in engagement between the fingers and wedge cam as a result of the arcuate motion of the distal ends of the fingers, it does not noticeably affect the gauging accuracy.

By locating this transverse band or rib 74 directly opposite the apex of the work contacting convex surface of each work contacting button, any coupling stress in the fingers is avoided which might otherwise impose on the fingers a strain providing a source of gauging error.

It is to be understood that while this disclosure has shown a small bore gauge and some of the following claims may refer to a bore gauge, I do not intend to be limited to bore gauges in the broadest aspect of the invention. For example, if the gauge has but two fingers at 180° locations, it could be used to measure inside dimension between opposed walls that might be other than a bore, such as the distance between closely spaced plates.

What is claimed is:

1. An internal measuring gauge comprising, in combination;
    an elongated probe having at least one longitudinally extending work contacting finger hinged to the probe for lateral movement away from and return toward the probe, said finger having a narrow rib on the underside thereof extending transversely of the finger and parallel to its hinge axis and terminating in an inwardly facing planar bearing surface inclined to the longitudinal dimension of the probe;
    a plunger extending longitudinally of the probe and being movable longitudinally thereof; and
    a wedge cam carried by the plunger and movable therewith, said wedge cam having an outwardly facing planar bearing surface inclined to the longitudinal dimension of the probe at substantially the same angle as the planar bearing surface of the rib of the finger and so presented to the latter that the two bearing surfaces are in surface contact with one another, one of said planar bearing surfaces being divided in a direction extending longitudinally of the finger by a groove thereby to provide spaced apart bearing areas.

2. The invention defined by claim 1 characterized in that the bearing surface divided by the groove is the planar bearing surface of the wedge cam.

3. A small diameter bore gauge comprising, in combination:
    a probe having measurement indicator means at one end thereof and at the other end thereof a plurality of longitudinally extending equally circumaxially arranged fingers resiliently hinged to the probe;
    a plunger extending coaxially of the probe and being axially movable therealong in opposite directions, said plunger being connected at one end to the indicator means for measuring the extent of axial movement of the plunger;
    a wedge cam connected to the opposite end of the plunger and having beveled bearing surfaces opposed to and cooperating with the fingers to swing them about their respective hinges upon displacement of the wedge cam longitudinally of the probe; and
    each said finger having a rounded outwardly facing work contacting surface and further having an inwardly projecting narrow rib extending transversely of the finger and terminating in a bearing surface engaging the opposed bearing surface of the wedge cam, one of each of such engaged bearing surfaces being provided with a groove extending longitudinally of the probe and dividing the bearing contact between each finger and the wedge cam into two spaced bearing areas.

4. In an internal measuring gauge having an elongated probe member and gauging means constituted by a plurality of fingers equally circumferentially spaced apart from one another and similarly flexually hinged at a common end to the probe member, said plurality of fingers having their respective opposite ends outwardly spherically rounded to form a gauging surface and free to move from a contracted position occupying a circular space less than that for which the measuring gauge is designed to a range of positions outwardly beyond the external surface of the probe member for which the measuring gauge is designed to measure, and a wedge cam shiftable axially of the probe member and provided with a plurality of correspondingly inclined planar bearing surfaces equally circumferentially spaced apart around the axis of the probe member and located in individually confronting relationship to the undersides of the free ends of the plurality of fingers, wherein the improvement comprises a narrow rib projecting from the underside of the free end of each finger in transverse relation thereto and forming a narrow planar bearing face opposing the confronting one of the planar bearing surfaces of the wedge cam, the planar bearing face of each said narrow rib intersecting the axis of the spherically rounded gauging surface of its finger which perpendicularly intersects the axis of the probe member and further being inclined at the same angle as the opposing inclined planar surface of the wedge cam against which it bears.

5. The combination in an internal measuring gauge as set forth in claim 4, wherein the improvement further comprises having the inclined planar surfaces of the wedge cam and the bearing surfaces of the narrow ribs of the fingers extend at an angle to the axis of the probe member to provide a 1:1 ratio between diameter variations of the bores of objects measured and corresponding wedge cam travel along the axis of the probe member.

6. The combination in an internal measuring gauge as set forth in claim 5, wherein said angle is 26° and 34 minutes.

7. A small diameter bore gauge comprising, in combination:
    an elongated hollow probe member having measurement indicator means mounted adjacent to one end thereof and a plurality of longitudinally extending equally circumferentially spaced apart fingers adjacent to the other end of the probe member each of which is flexually hinged at a common end to the probe member and has the opposite end terminating freely for swinging movement about the hinge axis laterally outwardly and inwardly with respect to the probe member;
    a plunger member extending coaxially through the hollow interior of the probe member and being axially movable therealong in opposite directions, said plunger member being operatively connected at one end to the measurement indicator means for measuring the extent of the axial movement of the plunger member;
    a wedge cam operatively connected to the opposite end of the plunger member for joint axial movement therewith and provided with a plurality of similar inclined planar surfaces equally circumferentially spaced about the axis of the probe member and located in individually opposed relationship to the undersides of the free ends of the plurality of fingers and cooperating therewith to swing the outer ends of the fingers about their hinged connection to the probe member upon displacement of the wedge cam axially of the probe member;
    each said finger having the outer side of its free end convexly rounded to form a gauging surface and further having a narrow rib projecting inwardly from the underside of the finger in transverse relation thereto and forming a narrow planar bearing surface engaging the opposing planar bearing surfaces of the wedge cam, the planar bearing surface of each said narrow rib intersecting that axis of the convexly rounded gauging surface which perpendicularly intersects the axis of the probe member and further being inclined at the same angle as the opposing inclined planar surface of the wedge cam against which it bears; said angle being selected to provide a 1:1 ratio between diameter variations of the bores of objects measured and corresponding wedge cam travel; and one of each of such engaged bearing surfaces being provided with a groove extending longitudinally of the probe member and dividing the bearing contact between each finger and the wedge cam into two spaced bearing areas.

* * * * *